US012370822B2

(12) United States Patent
Takahashi

(10) Patent No.: US 12,370,822 B2
(45) Date of Patent: Jul. 29, 2025

(54) PRINTER AND BOOKBINDING ASSISTING TOOL

(71) Applicants: CITIZEN WATCH CO., LTD., Tokyo (JP); CITIZEN SYSTEMS JAPAN CO., LTD., Tokyo (JP)

(72) Inventor: Akira Takahashi, Nagano (JP)

(73) Assignees: CITIZEN WATCH CO., LTD., Tokyo (JP); CITIZEN SYSTEMS JAPAN CO., LTD., Tokyo (JP)

( * ) Notice: Subject to any disclaimer, the term of this patent is extended or adjusted under 35 U.S.C. 154(b) by 0 days.

(21) Appl. No.: 18/846,624

(22) PCT Filed: Dec. 28, 2022

(86) PCT No.: PCT/JP2022/048561

§ 371 (c)(1),
(2) Date: Sep. 12, 2024

(87) PCT Pub. No.: WO2023/188662

PCT Pub. Date: Oct. 5, 2023

(65) Prior Publication Data

US 2025/0196524 A1 Jun. 19, 2025

(30) Foreign Application Priority Data

Mar. 28, 2022 (JP) ................................ 2022-051189

(51) Int. Cl.
*B65H 31/34* (2006.01)
*B42C 5/00* (2006.01)
*B65H 37/04* (2006.01)

(52) U.S. Cl.
CPC ............... *B42C 5/00* (2013.01); *B65H 31/34* (2013.01); *B65H 37/04* (2013.01); *B65H 2801/24* (2013.01)

(58) Field of Classification Search
CPC .. G03G 15/00; B42B 5/00; B42C 5/00; B65H 37/04; B65H 31/22; B65H 31/34
USPC ................................ 270/58.12, 58.17, 58.27
See application file for complete search history.

(56) References Cited

U.S. PATENT DOCUMENTS 8,905,394 B2 * 12/2014 Miyake .................. B65H 37/04 270/58.11
10,298,801 B2 * 5/2019 Kasuga .................. G03G 15/22
2024/0409346 A1 * 12/2024 Kondo .................. G03G 15/00

FOREIGN PATENT DOCUMENTS

JP 2002337478 A 11/2002
JP 2014094811 A 5/2014

* cited by examiner

*Primary Examiner* — Leslie A Nicholson, III
(74) *Attorney, Agent, or Firm* — Tucker Ellis LLP

(57) ABSTRACT

A printer includes a paper discharge tray that is configured to accumulate paper discharged from a discharge portion; and a holding member that is provided at a position where the paper discharged from the discharge portion is stacked, the holding member configured to be integrated with the paper discharge tray or held to be extractable from the paper discharge tray. The holding member includes a pair of side edge guide portions that are configured to guide opposite side edges of the paper. The holding member is configured to be held to be movable to a position of the paper in a width direction where the paper is stored between the pair of side edge guide portions in response to a force acting when the discharged paper comes into contact with the pair of side edge guide portions.

5 Claims, 9 Drawing Sheets

PRINTER AND BOOKBINDING ASSISTING TOOL

CROSS-REFERENCE TO RELATED APPLICATIONS

The present application is a national phase of International Application No. PCT/JP2022/048561, filed Dec. 28, 2022, and claims priority to Japanese Patent Application No. 2022-051189, filed with the Japanese Patent Office on Mar. 28, 2022, the content of which are incorporated herein by reference in their entireties.

TECHNICAL FIELD

The present invention relates to a printer and a bookbinding assisting tool.

BACKGROUND ART

A photo book is known to include images that are printed on paper from photographs taken by a camera or similar devices with a plurality of sheets of the printed paper bound together. It is necessary to firmly align the edges of the bound sheets of paper when forming such a photo book.

In addition, it is necessary to provide a front cover, a back cover, and a spine on the paper bundle or text block to bind the plurality of printed paper sheets as the photo book.

For example, Patent Literature 1 (JP 2002-337478 A) discloses a printer that is configured to bind a book by stacking sheets of printed paper on a front cover while a spine of the book is folded at the right angle.

SUMMARY

However, the printer disclosed in Patent Literature 1 has a large and complicated configuration as the device since the back cover is attached after aligning and stacking edges of the sheets of printed paper on a front cover member where the front cover and the spine are integrated.

The present invention has been made under the above-described circumstances, and an object of the present invention is to provide a printer and a bookbinding assisting tool capable of precisely aligning and binding a paper bundle with a simple configuration.

According to a first aspect of the present invention, a printer includes a paper discharge tray that is configured to accumulate paper discharged from a discharge portion; and a holding member that is provided at a position where the paper discharged from the discharge portion is stacked, the holding member configured to be integrated with the paper discharge tray or held to be extractable from the paper discharge tray. The holding member includes a pair of side edge guide portions that are configured to guide opposite side edges of the paper. The holding member is configured to be held to be movable to a position of the paper in a width direction where the paper is stored between the pair of side edge guide portions in response to a force acting when the discharged paper comes into contact with the pair of side edge guide portions.

According to a second aspect of the present invention, a bookbinding assisting tool is placeable at a position where paper discharged from a discharge portion of a printer and accumulated in a paper discharge tray is stacked. The bookbinding assisting tool is configured to hold a front cover member where a front cover, a back cover, and a spine are integrally formed by opening a portion confronting the spine to face the discharge portion. The front cover is held in a substantially V-shape.

DETAILED DESCRIPTION

Hereinafter, an embodiment of a printer and a bookbinding assisting tool according to the present invention will be described with reference to the drawings.

Figure 1:
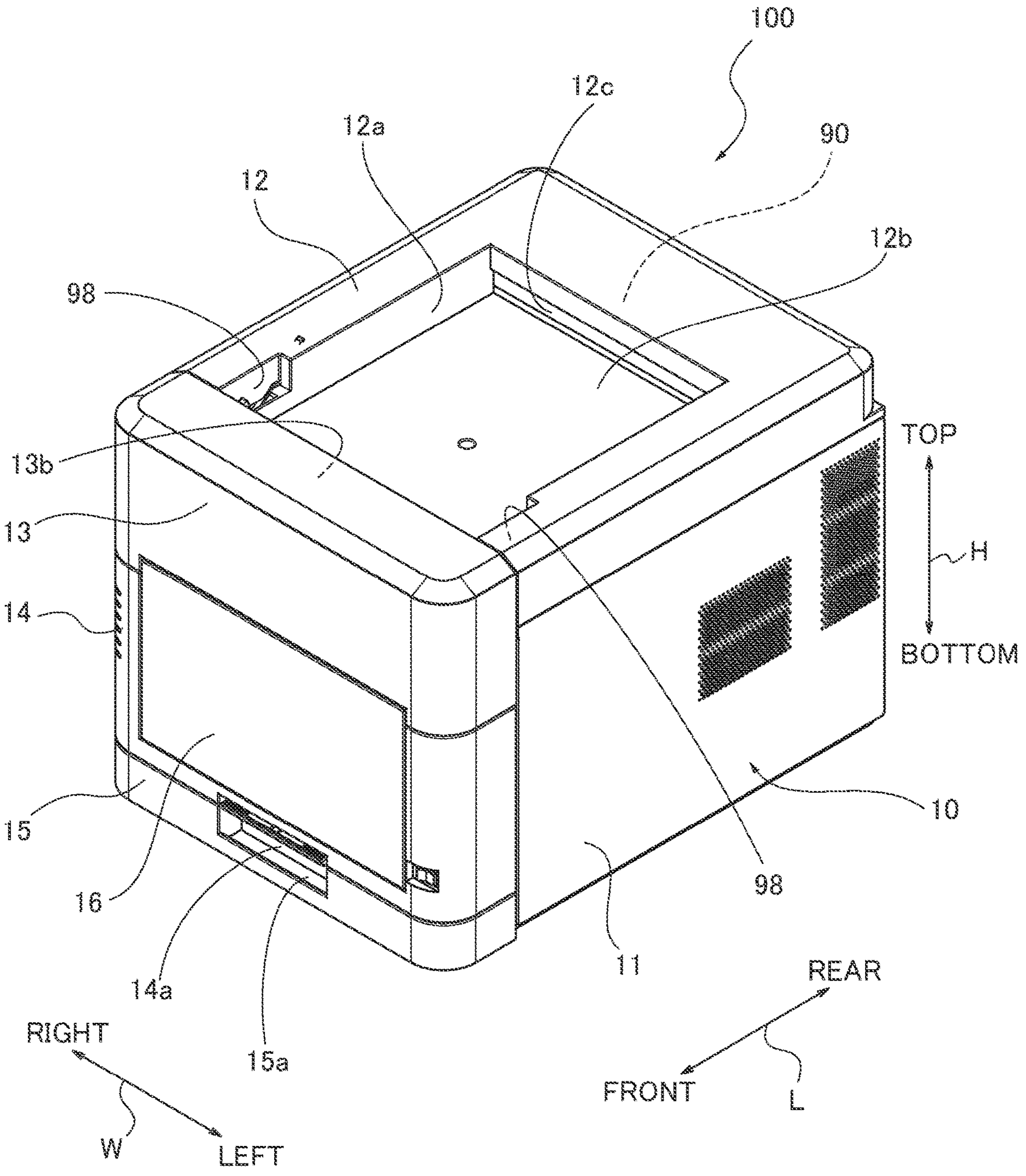
FIG. 1 is a perspective view illustrating an external appearance of a sublimation thermal printer (hereinafter, referred to as a printer).
Figure 2:
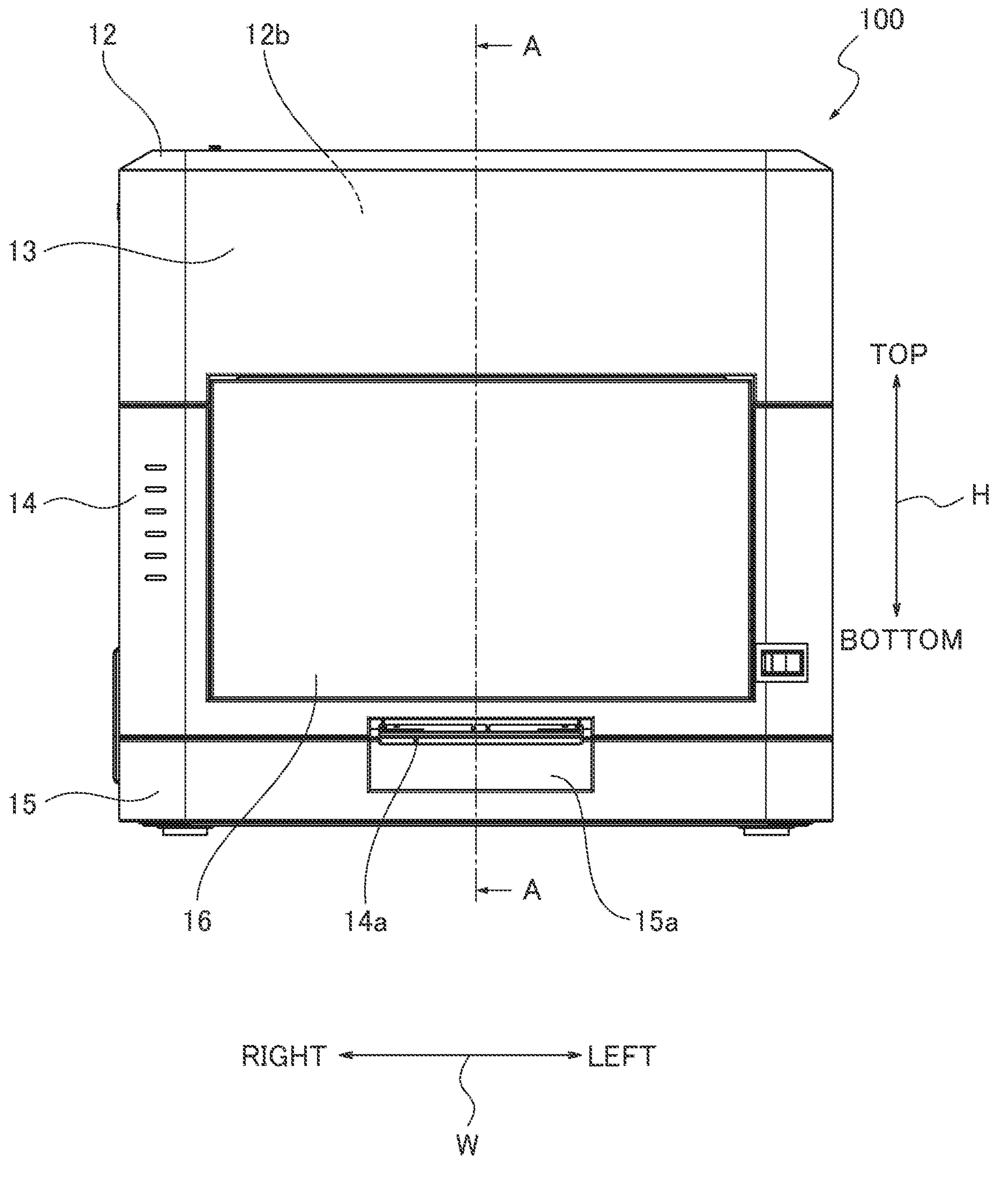
FIG. 2 is a front view illustrating the printer of FIG. 1 seen from a front side thereof.
Figure 3:
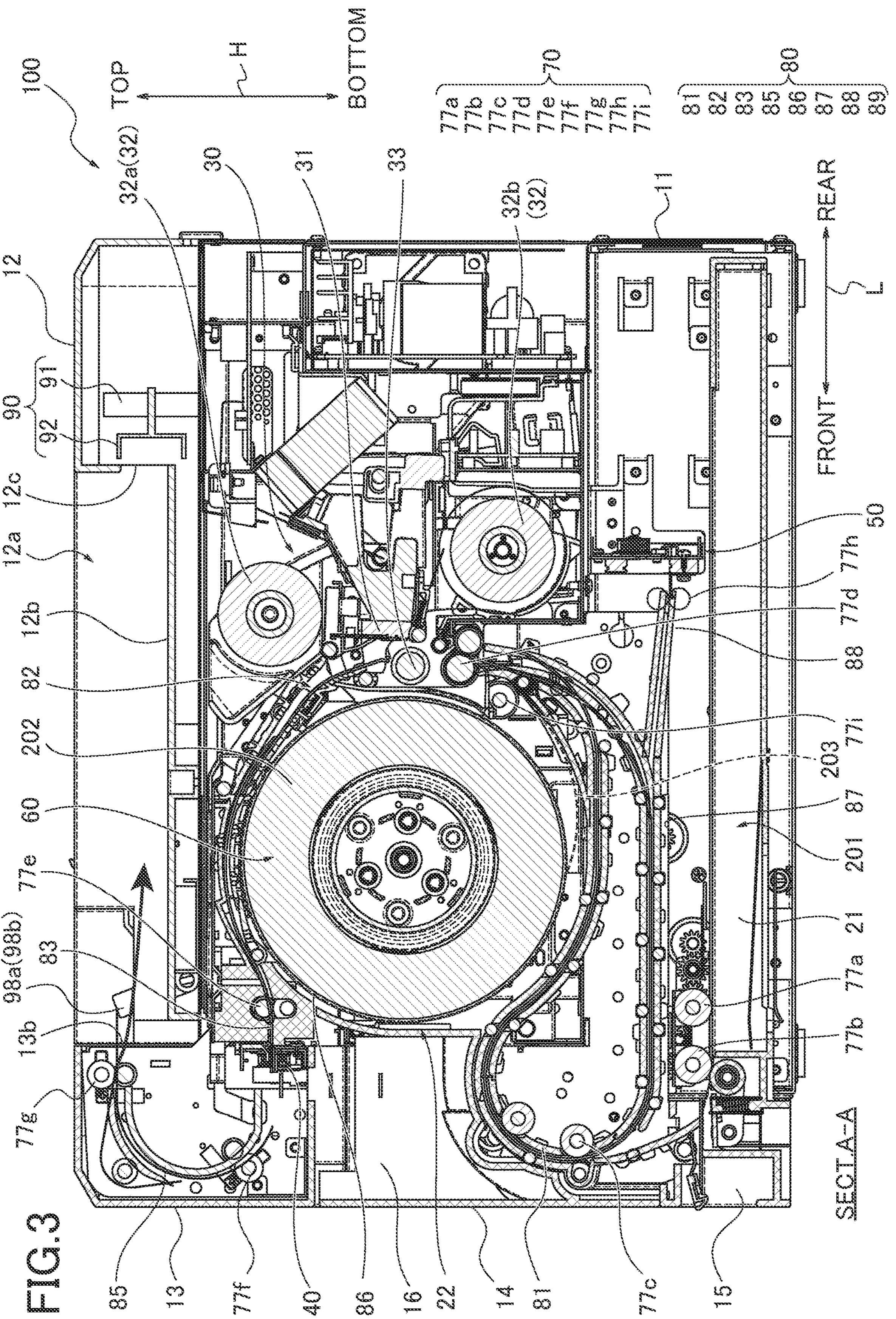
FIG. 3 is a cross-sectional view of the printer along a line A-A of FIG. 2 (vertical plane passing through the center of the printer in a width direction W and along a longitudinal direction L).

(Configuration) FIG. 1 is a perspective view illustrating the external appearance of a sublimation thermal printer 100 (hereinafter, referred to as a printer 100). FIG. 2 is a front view illustrating the printer 100 of FIG. 1 seen from the front. FIG. 3 is a cross-sectional view of the printer along a line A-A of FIG. 2 (vertical plane passing through the center of the printer 100 in a width direction W and along a longitudinal direction L).

The printer 100 illustrated in the drawings is an embodiment of the printer according to the present invention. The printer 100 includes a case 10, a sheet paper storage portion 21, a roll paper storage portion 22, a printing portion 30, a cutter 40, a creasing portion 50, a transport portion 70, a transport path 80, a heating portion 90 (an example of the binding portion), a pressing portion 98, and a holding member 110.

(Case) As illustrated in FIG. 1, the case 10 includes a case body 11, an upper cover 12, a front upper cover 13, a front middle cover 14, and a front lower cover 15.

The case body 11 is configured to cover a pair of side surfaces in the width direction W and a rear surface in the longitudinal direction L.

The upper cover 12 is provided to cover an opening on an upper surface of the case body 11 in a height direction H. The upper cover 12 includes an outer peripheral edge including a front end edge, a pair of side edges, and a rear end edge, and an inner portion. The upper cover 12 is formed with the front end edge and the inner portion which are recessed so that the recessed part functions as a paper discharge tray **12*a* that accumulates sheet paper 201 (hereinafter, also simply referred to as paper 201**) and/or paper

203 unwound or unrolled from roll paper 202 (hereinafter, also simply referred to as paper 203).

As illustrated in FIG. 3, a bottom surface 12*b* of the paper discharge tray 12*a* in the upper cover 12 is formed substantially horizontally. The bottom surface 12*b* may be formed to be inclined such that the height thereof decreases from the rear to the front in the longitudinal direction L or may be formed to be inclined such that the height thereof decreases from the front to the rear. Irrespective of the inclination in the longitudinal direction L, the bottom surface 12*b* is substantially horizontal in the width direction W without being inclined to the left or right side.

As illustrated in FIG. 3, the paper 201, 203 is discharged to the rear side as indicated by an arrow in FIG. 3 from an upper discharge port 13*b* (discharge portion) formed on the front side of the front upper cover 13 (described below) open to the rear side. Then, the discharged paper 201 202 is stacked and accumulated on the bottom surface 12*b* of the paper discharge tray 12*a*.

An opening 12*c* is formed in a rear end portion of the paper discharge tray 12*a*. The opening 12*c* is configured to receive a spine 302 (see FIG. 9) of a front cover member 300 held by the holding member 110 described below. The heating portion 90 (an example of the binding portion) is provided on the rear side of the opening 12*c*.

The front upper cover 13 is disposed on an upper part of the front side of the printer 100. The front lower cover 15 is disposed on a lower part of the front side of the printer 100. The front middle cover 14 is disposed between the front upper cover 13 and the front lower cover 15 on the front side of the printer 100.

(Internal Drawer) The front upper cover 13 and the front middle cover 14 are provided in an internal drawer 60 (an example of the drawer). The internal drawer 60 is provided in an inner space surrounded by the case body 11 and the upper cover 12. The internal drawer 60 is drawn to the front side relative to the case body 11 and the upper cover 12 when a user hooks his or her finger into a finger hook portion 14*a* formed on a lower portion of the front middle cover 14 and pulls the internal drawer 60 forward in the longitudinal direction L.

The internal drawer 60 is integrally provided with the roll paper storage portion 22, an ink ribbon 32, and a platen roller 33 of the printing portion 30, the cutter 40, the transport portion 70, and the transport path 80 in addition to the front upper cover 13 and the front middle cover 14.

The front upper cover 13 is supported to be rotatable toward the upper rear side in a state where the internal drawer 60 is drawn from the closed state illustrated in FIG. 1 to the front side from the inner space surrounded by the case body 11 and the upper cover 12. When the front upper cover 13 rotates to the upper rear side to be an opened state, a part of the front portion and a part of the upper portion of the roll paper storage portion 22 are opened. As a result, the roll paper storage portion 22 in the case 10 is exposed such that the roll paper 202 can be inserted into or removed from the roll paper storage portion 22.

The upper discharge port 13*b* is formed on the rear side of the front upper cover 13. The printed paper 201, 203 is discharged through the upper discharge port 13*b* to the paper discharge tray 12*a* formed in the upper cover 12 on the rear side of the front upper cover 13.

The front middle cover 14 is provided with a trash box 16. The trash box 16 is disposed below the cutter 40, which is described below, and detachably attached to the front middle cover 14. The trash box 16 is configured to receive and store cut paper pieces of the paper 201, 203 with the cutter 40.

The trash box 16 is removable from the front middle cover 14 to dispose of the cut paper pieces and/or other waste within the trash box 16.

The front lower cover 15 is formed on a front side of the sheet paper storage portion 21, which is formed as a tray (the front lower cover 15 is a part of the sheet paper storage portion 21).

(Sheet paper storage portion) As illustrated in FIG. 3, the sheet paper storage portion 21 is provided on the lowermost portion of the printer 100 below the roll paper storage portion 22. The sheet paper storage portion 21 is configured to store sheets of paper 201, each of which has been cut to a predetermined size in advance and stacked in the thickness direction.

The sheet paper storage portion 21 can be drawn to the front side relative to the case body 11 and the upper cover 12 when a user hooks his or her finger into a finger hook portion 15*a* formed on an upper portion of the front lower cover 15 and pulls the sheet paper storage portion 21 forward in the longitudinal direction L. The upper side of the sheet paper storage portion 21 is opened when it is drawn to the front side relative to the case body 11 and the upper cover 12. Accordingly, the sheet paper 201 can be inserted into or removed from the sheet paper storage portion 21 through the opened upper side.

(Roll paper storage portion) The roll paper storage portion 22 is configured to store the roll paper 202 in which elongated paper is wound into a roll shape. The roll paper storage portion 22 stores the roll paper 202 in a posture where the axis of the roll paper 202 is parallel to the width direction W of the printer 100.

The roll paper 202 is disposed to rotate counterclockwise in FIG. 3 when the paper 203 is drawn to be unrolled in the right direction in FIG. 3 from a lower end of the roll paper 202.

(Printing Portion) The printing portion 30 is disposed on the rear side of the roll paper storage portion 22. Under the control of a controller (not illustrated) of the printer 100, the printing portion 30 is configured to perform printing on the paper 201, 203 passing through a portion (a printing path 82 described below) of the transport path 80 rising substantially in the vertical direction on the rear side the roll paper storage portion 22.

The printing portion 30 includes a thermal head 31, the ink ribbon 32, and the platen roller 33. A sublimation dye is applied to a ribbon of the ink ribbon 32. The ink ribbon 32 is fed from a feeding side roll 32*a* to a winding side roll 32*b* in synchronization with the transport of the paper 201, 203 and the sublimation dye of the ink ribbon 32 is diffusively transferred to the paper 201, 203 with heat from the thermal head 31 contacting the ink ribbon 32. Thereby, the printing is performed on the paper 201, 203.

The ink ribbon 32 is provided in the internal drawer 60. The ink ribbon 32 can be drawn forward passing through a region above the roll paper storage portion 22 in an arc shape when the internal drawer 60 is drawn to the front side from the case body 11 and the front upper cover 13 is not rotated to the upper rear side.

As a result, the ink ribbon 32 can be removed upward from the open upper side of the internal drawer 60 between the upper cover 12 and the front upper cover 13, which facilitates the replacement of the ink ribbon 32.

The platen roller 33 is disposed on the opposite side of the ink ribbon 32 and the thermal head 31 with the paper 201, 203 interposed therebetween. The platen roller 33 is configured to press the paper 201, 203 against the ink ribbon 32.

(Cutter) The cutter 40 is disposed in the front upper cover 13 on the front side of the roll paper storage portion 22. Under the control of the controller (not illustrated) of the printer 100, the cutter 40 is configured to cut, along the width direction W, the paper 201, 203 passing through a portion (a discharge path 83 described below) of the transport path 80 extending forward from the upper side of the roll paper storage portion 22. Cut pieces of the paper 201 fall into and are stored in the trash box 16 disposed below the cutter 40.

(Creasing Portion) The creasing portion 50 is disposed on the rear side of the roll paper storage portion 22. The creasing portion 50 is located above the sheet paper storage portion 21 and below the printing portion 30. Under the control of the controller (not illustrated) of the printer 100, the creasing portion 50 forms a streak in the sheet paper 201 passing through a portion (a creasing path 88 described below) of the transport path 80 extending below the roll paper storage portion 22 in the longitudinal direction L. The streak is a recess extending along the width direction W.

The streak formed in the paper 201 by the creasing portion 50 guides a fold line of the paper 201. The streak improves the spreadability of each sheet of the printed sheet paper 201 when the sheets of the sheet paper 201 are bound to make a photo book and forms a fold line at the center of a greeting card made with a single sheet of the paper 201.

(Transport Path) The transport path 80 is a path for transporting the paper 201, 203. First, a portion of the transport path 80 for transporting the sheet paper 201 will be described.

The portion of the transport path 80 for transporting the sheet paper 201 includes a paper feeding path 81, the printing path 82, the discharge path 83, an upper discharge path 85, a printing upstream path 86, a printing downstream path 87, and the creasing path 88.

The paper feeding path 81 extends upward from the front end of the sheet paper storage portion 21. Then, the paper feeding path 81 is folded and extends rearward and downward in a space formed on the front side of the roll paper storage portion 22 and on the rear side of the front middle cover 14 and extends toward the rear side of the roll paper storage portion 22 below the roll paper storage portion 22 and above the sheet paper storage portion 21. Further, the paper feeding path 81 extends to a position rising upward on the rear side of the roll paper storage portion 22.

Following the paper feeding path 81, the printing path 82 extends to rise upward along the rear side of the roll paper storage portion 22 on the rear side of the roll paper storage portion 22. Then, the printing path 82 extends forward to the front side of the roll paper storage portion 22 above the roll paper storage portion 22. The printing portion 30 is disposed in the printing path 82.

Following the printing path 82, the discharge path 83 extends forward in the longitudinal direction L from the front side of the roll paper storage portion 22 above the roll paper storage portion 22. The cutter 40 is disposed in the discharge path 83. The discharge path 83 extends longitudinally to a position forward of the cutter 40.

Following the discharge path 83, the upper discharge path 85 is bent upward and rearward and extends rearward to the upper discharge port 13*b*.

Following the printing path 82, the printing upstream path 86 extends from the front side of the roll paper storage portion 22 above the roll paper storage portion 22 coaxially with an outer periphery of the roll paper storage portion 22 toward the bottom side of the roll paper storage portion 22 to a position just before the paper feeding path 81.

A rotatable discharge switching flap is provided at a branch point between the printing upstream path 86 and the discharge path 83. The control of the controller (not illustrated) of the printer 100 controls the discharge switching flap to rotate. The rotation of the discharge switching flap switches the movement of the paper 201, which has moved forward along the printing path 82, either to the discharge path 83 or to the printing upstream path 86.

Following the end of the printing path 82 on the paper feeding path 81 side, the printing downstream path 87 extends forward from the rear of the roll paper storage portion 22 to the front thereof. Then, a front end of the printing downstream path 87 rises upward and is smoothly joined to paper feeding path 81 which also rises upward.

Printing is performed on a surface of the paper 201 in contact with the ink ribbon 32 in the printing path 82, that is, on the surface facing rearward in the longitudinal direction L in FIG. 3. The surface printed in the printing path 82 faces downward in the height direction H when the paper 201 is transported to the printing downstream path 87.

The paper 201 moves forward in the printing downstream path 87 and then in the paper feeding path 81 after the printing downstream path 87 is joined to the paper feeding path 81 rising upward. At this time, the printed surface of the paper 201 faces upward in the height direction H below the roll paper storage portion 22.

Further, the paper 201 moves rearward in the paper feeding path 81, and then in the printing path 82 rising upward. The printed surface faces forward in the longitudinal direction when the paper 201 moves in the printing path 82. In other words, the front and back surfaces of the paper 201 are reversed while the paper 201 moves from the printing downstream path 87 to the paper feeding path 81. Accordingly, the printing portion 30 can also perform printing on the back surface of the paper 201. The printing downstream path 87 and the paper feeding path 81 form a reversing portion that reverses the front and back surfaces of the paper 201.

The creasing path 88 extends downward toward the creasing portion 50 in a slightly lowered state from the rear of the printing downstream path 87 opposite to the paper feeding path 81 side instead of extending upward toward the printing path 82. The creasing portion 50 is disposed in the creasing path 88.

In a branch point between the portion of the printing downstream path 87 toward the printing path 82 and the creasing path 88, a rotatable creasing switching flap is provided. In a state where the tip of the creasing switching flap is biased upward, the paper 201 presses the creasing switching flap downward in a range where the tip is displaceable against the biasing force of a spring and advances to the printing downstream path 87 when the paper 201 is transported from the printing path 82 to the printing downstream path 87.

In a state where the paper 20 moved from the printing path 82 to the printing downstream path 87 has completely passed the creasing switching flap, the paper 201 of the printing downstream path 87 is switched to advance to the creasing path 88 without being transported to the printing path 82 when the tip of the creasing switching flap is biased upward.

On the other hand, in a state where the paper 201 moved from the printing path 82 to the printing downstream path 87 has not completely passed the creasing switching flap, the paper 201 slightly lowers the tip of the creasing switching flap. Therefore, the paper 201 in the printing downstream path 87 advances to the printing path 82 without being transported to the creasing path 88.

Next, a portion of the transport path 80 for transporting the paper 203 unrolled from the roll paper 202 will be described. The portion of the transport path 80 for transporting the paper 203 unrolled from the roll paper 202 includes a roll paper feeding path 89 in addition to the portion for transporting the sheet paper 201.

The roll paper feeding path 89 extends rearward from substantially the lowermost portion of the roll paper 202 set in the roll paper storage portion 22 to a position rising upward on the rear side of the roll paper storage portion 22.

In a portion where the paper feeding path 81 and the roll paper feeding path 89 are joined, a rotatable paper feeding switching flap is provided. In a state where the tip of the paper feeding switching flap is biased to the front side, the paper 201 transported in the paper feeding path 81 is switched to advance to the printing path 82, and the paper 201 transported from the printing path 82 is switched to advance to the printing downstream path 87.

On the other hand, in a state where the tip of the paper feeding switching flap is biased to the front side when the paper 203 unrolled from the roll paper 202 and transported in the roll paper feeding path 89 advances toward the printing path 82, the paper 203 presses the paper feeding switching flap rearward in a range where the tip is displaceable against the biasing force of a spring, and advances to the printing path 82.

When the paper 203 unrolled from the roll paper 202 is printed by the printing portion 30 of the printing path 82, the paper 203 is not separated from the roll paper 202. Therefore, the paper feeding switching flap remains pressed rearward in the range where the tip is displaceable by the portion of the paper 203 passing through the roll paper feeding path 89.

(Transport portion) The transport portion 70 includes a sheet paper feeding roller 77*a*, a paper feeding roller 77*b*, a reversing roller 77*c*, a grip roller 77*d*, a first feeding roller 77*e*, a first discharge roller 77*f*, a second discharge roller 77*g*, a second feeding roller 77*h*, and a roll paper feeding roller 77*i*.

Each of the rollers 77*a* to 77*i* for transport contacts the front surface or the back surface of at least one of the sheet paper 201 and the paper 203 and rotates to transport the paper 201, 203 along the transport path 80 under the control of the controller (not illustrated) of the printer 100.

Figure 4:
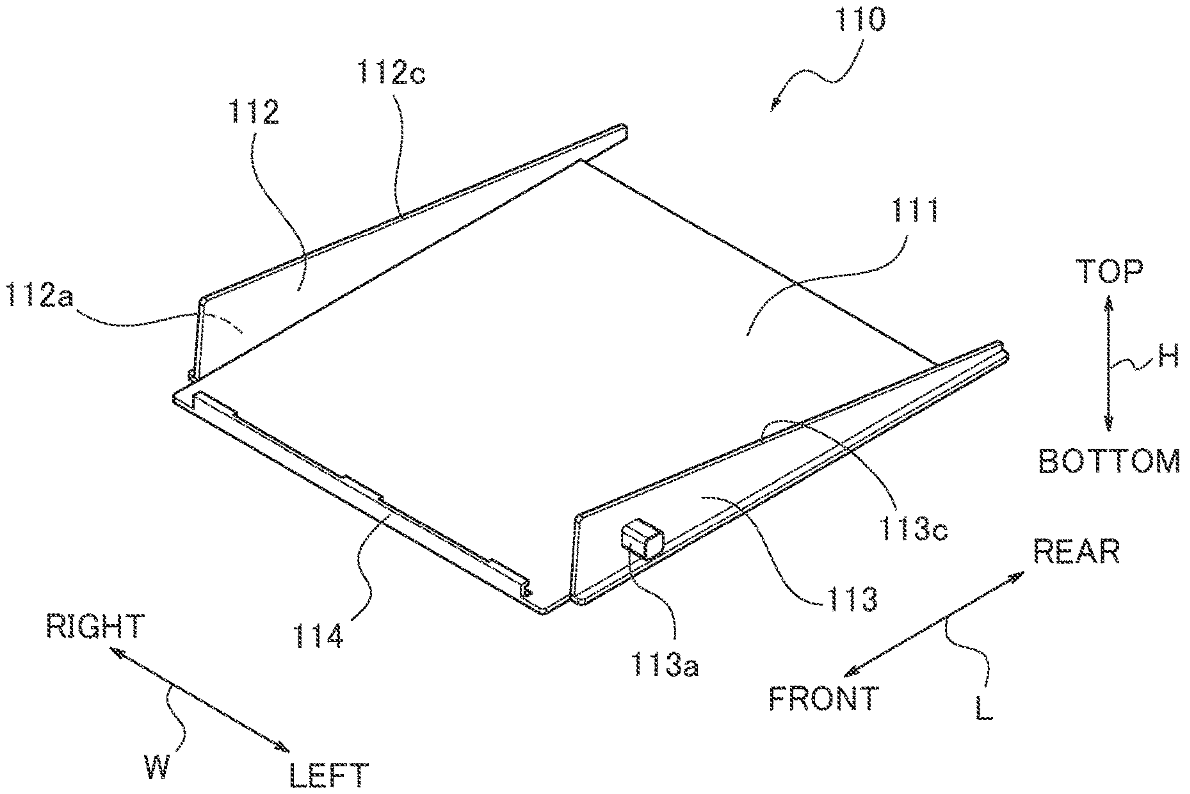
FIG. 4 is a perspective view illustrating a holding member.
Figure 5:
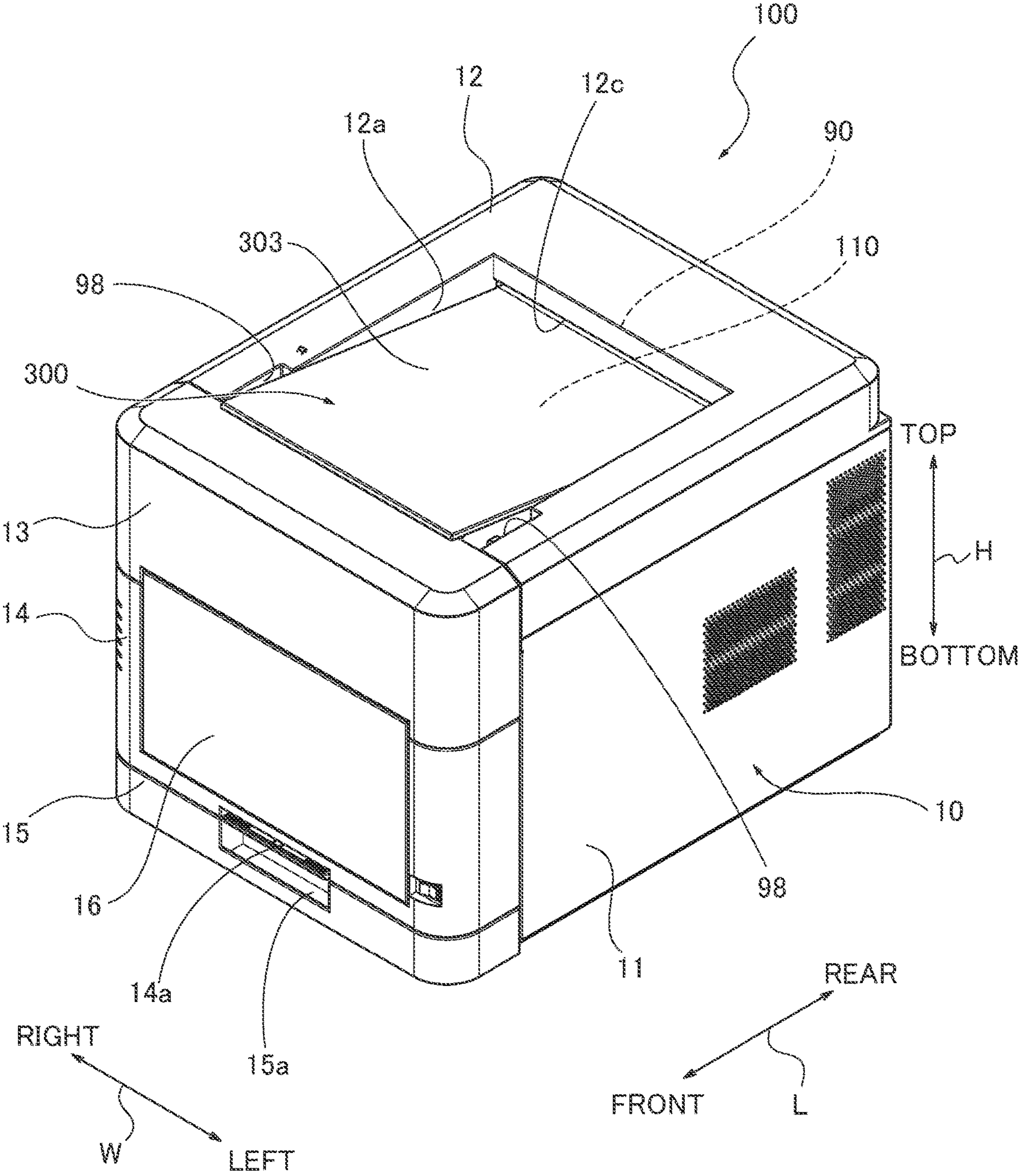
FIG. 5 is a perspective view illustrating the printer in which the holding member is set to a paper discharge tray while holding a front cover member.
Figure 6:
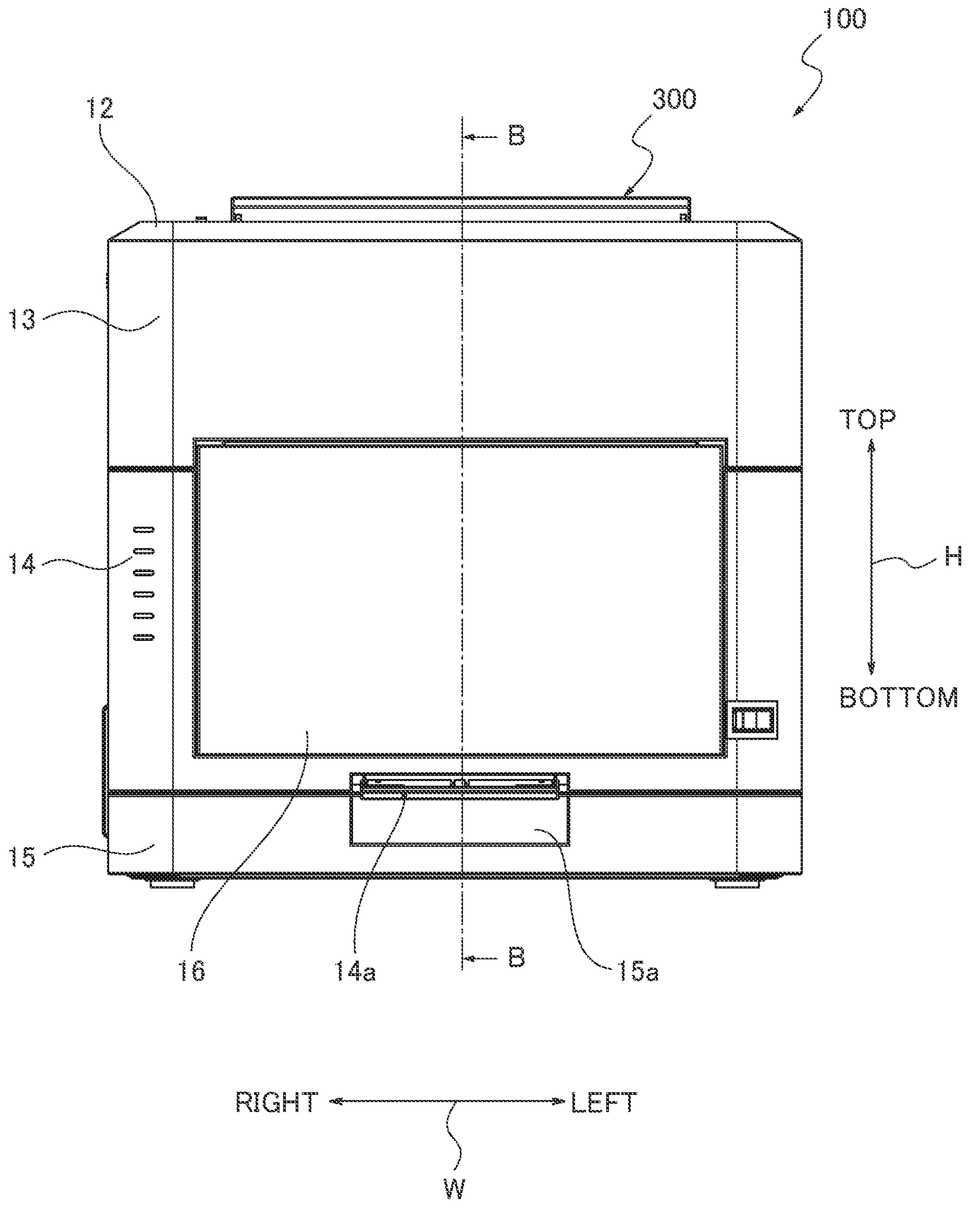
FIG. 6 is a front view illustrating the printer in the state of FIG. 5.
Figure 7:
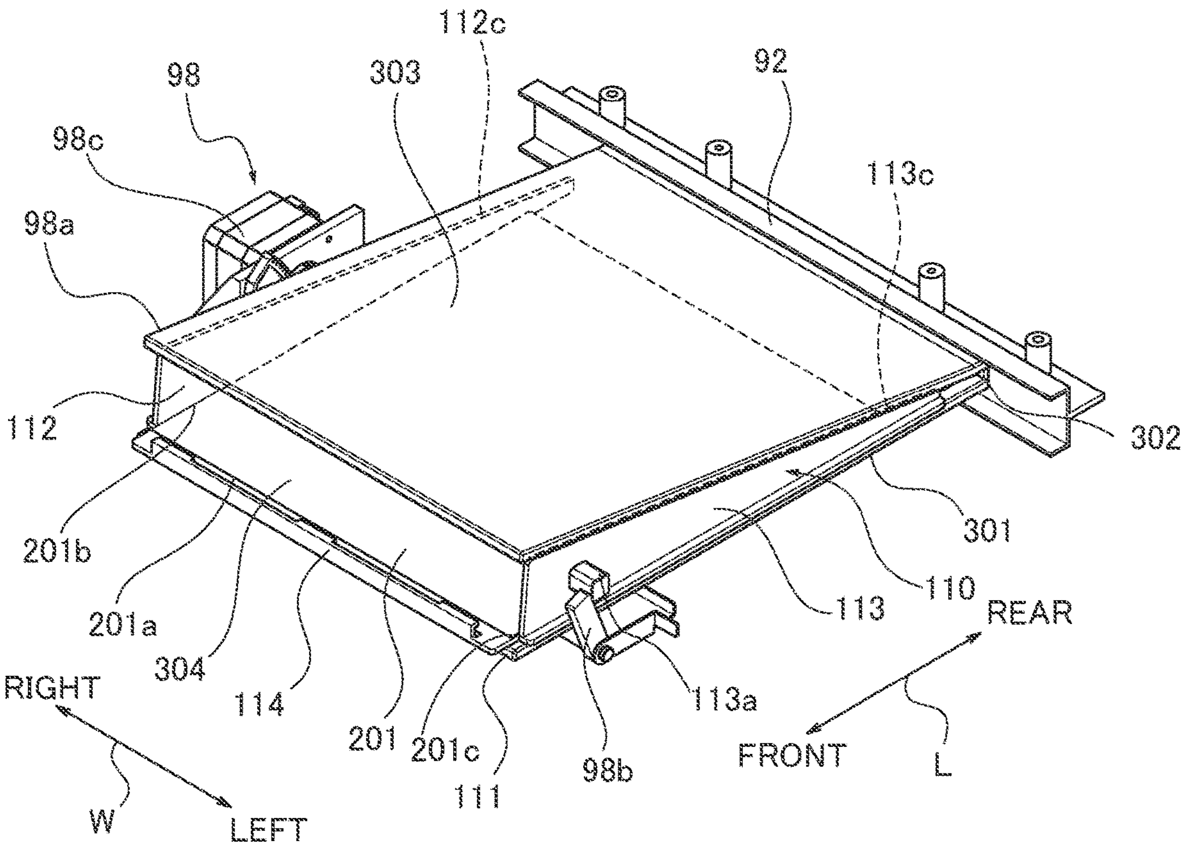
FIG. 7 is a perspective view illustrating main components including the holding member and the front cover member in the state of FIG. 5.
Figure 8:
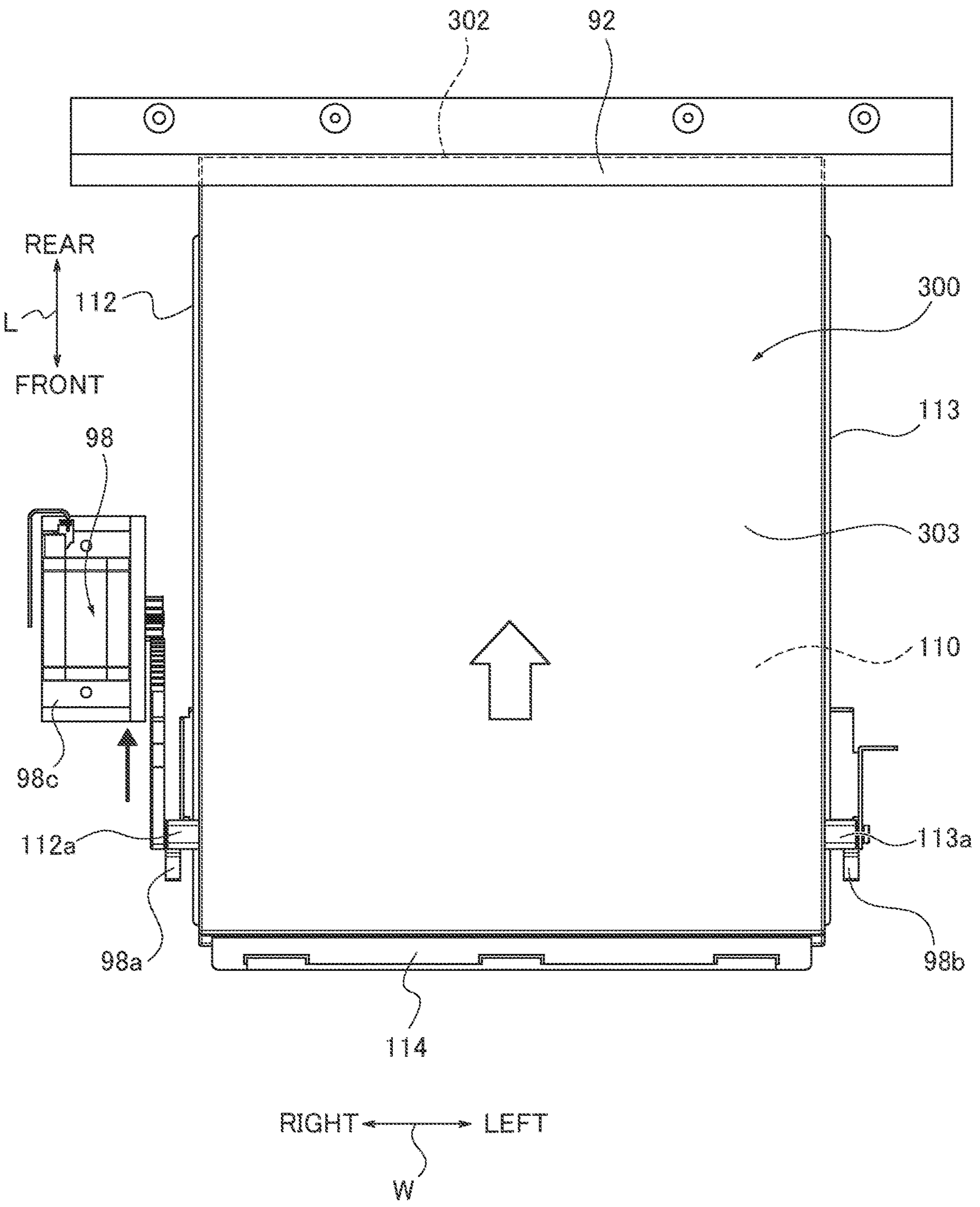
FIG. 8 is a plan view illustrating the state illustrated in FIG. 7.
Figure 9:
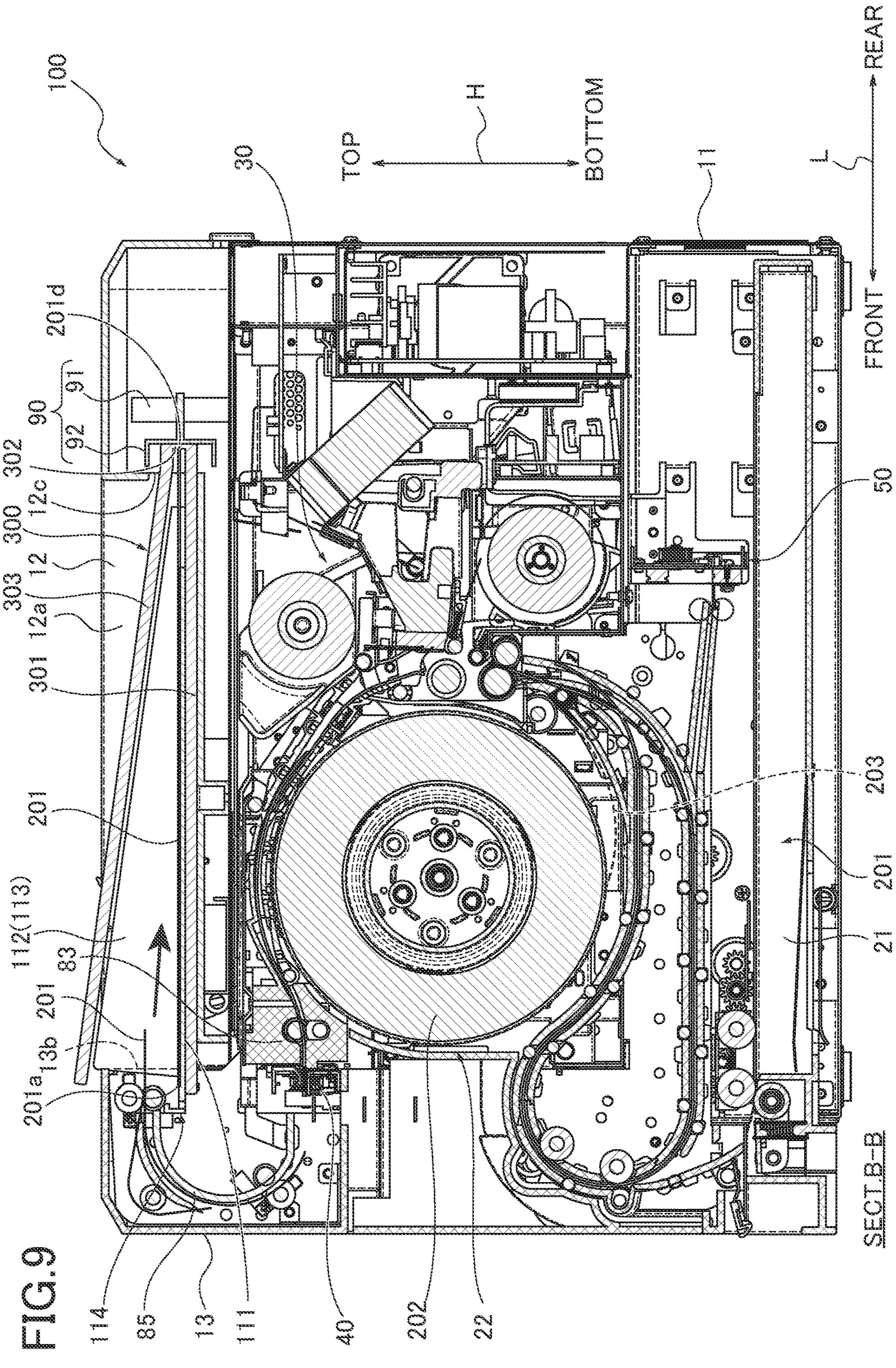
FIG. 9 is a cross-sectional view of the printer along a line B-B in FIG. 6.

(Holding Member) FIG. 4 is a perspective view illustrating the holding member 110 (also referred to as the bookbinding assisting tool 110). FIG. 5 is a perspective view illustrating the printer in a state where the holding member 110 is set to the paper discharge tray 12*a* while holding the front cover member 300. FIG. 6 is a front view illustrating the printer 100 in the state of FIG. 5. FIG. 7 is a perspective view illustrating the main components including the holding member 110 and the front cover member 300 in the state of FIG. 5. FIG. 8 is a plan view illustrating the state illustrated in FIG. 7. FIG. 9 is a cross-sectional view of the printer along line B-B in FIG. 7.

The holding member 110 is provided at a position where the paper 201 discharged from the upper discharge port 13*b* is stacked. The holding member 110 is integrated with the paper discharge tray 12*a*. Alternatively, the holding member 110 is held in the printer to be extractable from the paper discharge tray 12*a*. As illustrated in FIG. 5, the holding member 110 includes a substantially rectangular bottom plate 111, side plates 112, 113 that extend upward in the height direction H from respective side edges of the bottom plate 111 in the width direction W, and a front plate 114 that extends upward in the height direction from a front edge of the bottom plate in the longitudinal direction.

A distance in the width direction W between surfaces (inner surfaces) of the opposite side plates 112, 113 facing inward in the width direction W is formed to be slightly wider than a dimension of the paper 201 in the width direction W. Accordingly, as illustrated in FIGS. 5 and 9, even when the paper 201 is discharged rearward from the upper discharge port 13*b* toward the paper discharge tray 12*a* with some variation in the width direction W in a state where the holding member 110 is set in the paper discharge tray 12*a* while holding the front cover member 300, the side edges 201*b*, 201*c* of the paper 201 in the width direction W contact the inner surfaces of the side plates 112, 113, respectively as illustrated in FIG. 7 and the positions of the plurality of sheets of the paper 201 in the width direction W are correctly aligned. Thereby, the plurality of sheets of the paper 201 is stacked on the bottom plate 111 with the side edges 201*b*, 201*c* aligned.

Accordingly, the side plates 112, 113 correspond to the pair of side edge guide portions that guide the side edges 201*b*, 201*c* of the discharged paper 201.

In each of the side plates 112, 113, a front end in the longitudinal direction L has the highest height and a rear end has the lowest height. The side plates 112, 113 include upper end edges 112*c*, 113*c*, respectively, which extend linearly between the front end and the rear end. Thus, each of the side plates 112, 113 is formed in a substantially triangular shape that is elongated in the longitudinal direction. The height of the front ends of the side plates 112, 113 is more than the height of a region from the bottom surface 12*b* to the upper discharge port 13*b* of the paper discharge tray 12*a*.

As illustrated in FIGS. 4, 7, and 8, protrusion portions 112*a*, 113*a* are formed on surfaces (outer surfaces) of the side plates 112, 113 facing outward in the width direction W. The protrusion portions 112*a*, 113*a* protrude outward in the width direction W. The protrusion portions 112*a*, 113*a* receive a pressing links 98*a*, 98*b* of the pressing portion 98, which will be described below, from the front side, respectively.

The holding member 110 holds, for example, the front cover member 300 for a photo book. As illustrated in FIG. 7, the front cover member 300 is a member where a front cover 301, the spine 302, and a back cover 303 are arranged in this order in a given direction and connected. In the front cover member 300, a plurality of printed sheets of the paper 201 are bound, one surface of the bundle is covered with the front cover 301, the other surface of the bundle is covered with the back cover 303, and a surface (surface in the thickness direction) along a stacking direction when the paper 201 is bound is covered with the spine 302. Thereby, the photo book is bound.

On the inner surface of the spine 302, a hot melt that melts with heat is provided in advance. This hot melt melts when the spine 302 is heated by the heating portion 90 described below. Then, the paper 201 is pressed against the spine 302 and adheres to the spine 302. Thereby, the photo book is made as an integrated whole.

As illustrated in FIG. 7, the holding member 110 is held such that the front cover 301 of the front cover member 300 is stacked on the lower side of the bottom plate 111, the back cover 303 is placed on the upper end edges 112*c*, 113*c* of the opposite side plates 112, 113, and the spine 302 is disposed on the rear side of the rear ends of the opposite side plates 112, 113. Thereby, a portion (side of the front end edges of the side plates 112, 113) of the front cover member 300 confronting the spine 302 is held in an open state. At this time, a cross-section of the front cover member 300 along a vertical plane in the longitudinal direction L has a substantially V-shape.

In a state where the holding member 110 holds the front cover member 300 in the above-described V-shape in cross-section, the spine 302 is inserted into the opening 12*c* in the rear end portion of the paper discharge tray 12*a* and disposed in the paper discharge tray 12*a*. As a result, as illustrated in FIG. 9, the portion of the front cover member 300 confronting the spine 302 is opened and held in a state where the portion faces the upper discharge port 13*b*.

When the holding member 110 holds the front cover member 300 and the printed paper 201 is discharged from the upper discharge port 13*b*, the discharged printed paper 201 is stacked on the bottom plate 111 of the holding member 110 as illustrated in FIGS. 7 and 9.

Rear end edges 201*a* of the paper 201 stacked on the bottom plate 111 (i.e., end edge on the final discharge side when the paper 201 is discharged from the upper discharge port 13*b* to the paper discharge tray 12*a*) are positioned in the rear of the front plate 114 of the holding member 110 in the longitudinal direction L.

In a state where the holding member 110 holds the front cover member 300 in the substantially V-shape in cross-section and is disposed in the paper discharge tray 12*a*, the holding member 110 is displaceable in the width direction W in accordance with the variation in the width direction W of the paper 201 discharged from the upper discharge port 13*b*. Specifically, when the paper 201 is discharged with some variation in the width direction W, for example, the side edge 201*b* of the discharged paper 201 abuts against the inner surface of the side plate 112, and accordingly, the holding member 110 is displaced to the side of the side edge 201*b* of the paper 201. In addition, for example, the side edge 201*c* of the discharged paper 201 abuts against the inner surface of the side plate 113, and accordingly, the holding member 110 is displaced to the side of the side edge 201*c* of the paper 201.

As described above, the distance in the width direction W between the side plates 112, 113 is formed to be slightly wider than the dimension of the paper 201 in the width direction W. The position in the width direction W of the paper 201 may vary when the paper 201 is discharged from the upper discharge port 13*b*, and thus, the paper 201 may abut against the inner surfaces of the opposite side plates 112, 113 or slightly run onto the upper portions of the side plates 112, 113.

If the holding member 110 is disposed in a state where it is not displaced in the width direction W, the side edges 201*b*, 201*c* of the discharged paper 201 may abut against the inner surface of the side plates 112, 113, respectively, or the discharged paper 201 may slightly run onto the side plates 112, 113. As a result, the paper 201 may be deformed or vary in the thickness direction and stacked on the bottom plate 111.

In this state, most of the planes of the paper 201 are closely placed to each other without a gap, and static electricity is generated in the paper 201, for example, when the paper 201 is discharged. Accordingly, even when the user attempts to align the side edges 201*b*, 201*c* of the paper 201, for example, by pressing the side edges 201*b*, 201*c* of the paper 201, the surfaces of the paper 201 cannot be moved from a state where they are attracted to each other with a strong force due to the action of the static electricity and cannot be appropriately aligned.

On the other hand, the holding member 110 of the present invention is displaceable in the width direction W in accordance with the paper 201. Therefore, when the side edges 201*b*, 201*c* of the discharged paper 201 abut against the inner surfaces of the side plates 112, 113, respectively, or the discharged paper 201 slightly runs onto the opposite side plates 112, 113, the holding member 110 is subjected to a force generated by the paper abutting against it, i.e., a force displacing the holding member 110 in the width direction W.

Due to this force, the holding member 110 moves in the width direction W to a position where the paper 201 is stored between the side plates 112, 113 of the holding member 110 before the discharged paper 201 is stacked on the paper 201 that has been already discharged on the bottom plate 111 of the holding member 110 (before the discharged paper 201 is adsorbed to the previously discharged paper 201 with the static electricity). Thereby, the discharged paper 201 is stacked on the bottom plate 111 with the side edges 201*b*, 201*c* aligned.

The holding member 110 can also be used for cases other than bookbinding. For example, the holding member 110 is also applicable to a case where a calendar is printed by printing twelve sheets of the paper 201 corresponding to twelve months by one-side printing or printing six sheets of the paper 201 corresponding to twelve months by double-sided printing. In the case other than bookbinding, only the holding member 110 is disposed on the paper discharge tray 12*a* without holding the front cover member 300.

(Pressing Portion) The pressing portion 98 that presses the holding member 110 rearward in the longitudinal direction L is provided on a side portion of the paper discharge tray 12*a*. As illustrated in FIGS. 7 and 8, the pressing portion 98 includes a pressing driving portion 98*c* and the pressing link 98*a*, 98*b*. As illustrated in FIGS. 3 and 8, the pressing links 98*a*, 98*b* are provided in front portions of sides of the paper discharge tray 12*a*.

The pressing driving portion 98*c* is driven under the control of the controller (not illustrated) of the printer 100. The pressing links 98*a*, 98*b* are linked to the pressing driving portion 98*c*. When the pressing driving portion 98*c* is driven, the pressing links 98*a*, 98*b* are displaced rearward in the longitudinal direction L in conjunction with each other. At this time, when the holding member 110 that holds the front cover member 300 is disposed in the paper discharge tray 12*a*, the pressing links 98*a*, 98*b* that are displaced rearward are hung in the protrusion portions 112*a*, 113*a* provided on the outer surfaces of the side plates 112, 113 of the holding member 110 and accordingly, the protrusion portions 112*a*, 113*a* are simultaneously pressed rearward by the same dimension.

As a result, the holding member 110 is pressed rearward, and a bundle of the paper 201 stacked on the bottom plate 111 of the holding member 110 is stopped by the inertial force. At this time, the front plate 114 of the holding member 110 abuts against the rear end edge 201*a* (see FIG. 7) of the paper 201 to press the paper 201 rearward. As a result, the rear end edges 201*a* of the bundle of the paper 201 are aligned in the longitudinal direction L. Accordingly, the pressing portion 98 and the front plate 114 of the holding member 110 correspond to the paper alignment portion that aligns the rear end edges 201*a* of the discharged paper 201.

When the paper 201 stacked on the bottom plate 111 of the holding member 110 is discharged from the upper discharge port 13*b*, the paper 201 is stacked with the position of the rear end edge 201*a* of the paper 201 aligned before being adsorbed to the previously discharged paper 201 by the static electricity.

If the plurality of sheets of the paper 201 is stacked with the positions of the rear end edge 201*a* side varied, the variations of the paper 201 on the rear end edge 201*a* side are aligned by driving the pressing driving portion 98*c* unless the surfaces of the paper 201 are attracted to each other with a strong force due to the action of the static electricity.

In addition, an anti-static brush that contacts the paper 201 to remove the static electricity from the paper 201 may be provided in the vicinity of the upper discharge port 13*b* to prevent static electricity from being generated in the paper 201 or reduce the static electricity generated in the paper 201 when the paper 201 is discharged from the upper discharge port 13*b*.

A tip edge 201*d* of the paper 201 pressed rearward (a leading end or tip when the paper 201 is discharged from the upper discharge port 13*b*, and an end closest to the spine 302; see FIG. 9) abuts against the inner surface of the spine 302 where the hot melt is disposed.

The front cover member 300 is displaced rearward when the spine 302 is pressed rearward by the tip edge 201*d* of the paper 201 and the rear ends of the side plates 112, 113. As a result, as illustrated in FIGS. 7, 8, and 9, the outer surface of the spine 302 abuts against a heat transfer member 92 of the heating portion 90 described below. In other words, the pressing portion 98 presses the holding member 110 to displace the spine 302 toward the heating portion 90.

(Heater) As illustrated in FIGS. 3 and 9, the heating portion 90 includes a heater 91 and the heat transfer member 92. The heater 91 is configured to generate heat under the control of the controller (not illustrated) of the printer 100. The heat transfer member 92 is disposed in the rear of the opening 12*c* and extends in the width direction W. The heat transfer member 92 is formed such that a cross-section of a vertical plane taken in the longitudinal direction L has a substantially angular Y-shape. The width between the tips of the substantially angular Y-shape is wider than the width of the spine 302. Legs of the substantially Y-shape of the heat transfer member 92 are connected to the heater 91 such that the heat of the heater 91 is transferred thereto.

The heating portion 90 transfers the heat generated by the heater 91 to the heat transfer member 92 such that the heat transfer member 92 is overheated. The heating portion 90 heats the spine 302 whose outer surface is in contact with the heat transfer member 92. Thereby, the hot melt on the inner surface of the spine 302 melts and adheres to the tip side of the paper 201 pressed against the inner surface of the spine 302. Accordingly, the heating portion 90 corresponds to the binding portion that binds the bundle of the paper 201 together with the front cover member 300.

The operation of the printer 100 configured as described above will be described. First, the operation of printing the sheet paper 201 for bookbinding will be described.

(Operation on Sheet Paper) First, the sheet paper feeding roller 77*a* rotates to feed, to the paper feeding path 81, an uppermost sheet of sheet paper 201 among a plurality of sheets of the sheet paper 201 stacked within the sheet paper storage portion 21. Further, the paper feeding roller 77*b* and the reversing roller 77*c* rotate to transport the sheet paper 201 in the paper feeding path 81.

The paper feeding switching flap 73 guides the sheet paper 201 to the printing path 82 and the grip roller 77*d* rotates to advance the sheet paper 201 along the printing path 82. Then, the discharge switching flap guides the sheet paper 201 to the printing upstream path 86.

When the sheet paper 201 advances to the end of the printing upstream path 86, the grip roller 77*d* is reversed (i.e., the rotation direction is reversed), the sheet paper 201 passes through the printing portion 30, and the sheet paper 201 advances to the printing downstream path 87 while printing is performed on the front surface of the sheet paper 201.

In a case where color printing is performed on the front surface of the sheet paper 201, when an overcoat processes with the ink ribbon 32 while changing the color of the ink ribbon 32, the transport and the printing are repeated by switching the rotation direction of the grip roller 77*d*, and then, the color printing and the overcoat process on the front surface are terminated.

When the printing on the front surface of the sheet paper 201 has been completed, the reversing roller 77*c* rotates to transport the sheet paper 201 to the paper feeding path 81. Then, the front and back surfaces of the sheet paper 201 are reversed when the sheet paper 201 passes through the reversing portion formed by the printing downstream path 87 and the paper feeding path 81. In other words, the sheet paper 201 is reversed when passing through the reversing portion, and the surface of the sheet paper 201 to printed by the printing portion 30 in the printing path 82 is reversed.

The rotation of the grip roller 77*d* is reversed again. Then, the grip roller 77*d* rotates to transport the sheet paper 201 that has been reversed to the end of the printing upstream path 86.

When the sheet paper 201 advances to the end of the printing upstream path 86, the grip roller 77*d* is reversed again and the sheet paper 201 passes through the printing portion 30. The sheet paper 201 advances to the printing downstream path 87 while printing is performed on the back surface of the sheet paper 201.

In a case where color printing is performed on the back surface of the sheet paper 201, when an overcoat processes with the ink ribbon 32 while changing the color of the ink ribbon 32, the transport is repeated, and then, the color printing and the overcoat process are terminated.

When the printing on the back surface of the sheet paper 201 is completed, the grip roller 77*d* is reversed again and the sheet paper 201 passes through the printing path 82. Then, the discharge switching flap is switched to transport the sheet paper 201 to the discharge path 83.

In the discharge path, the first feeding roller 77*e* rotates to move the sheet paper 201 to the cutter 40 and the cutter 40 cuts an unnecessary portion of the rear end of the sheet paper 201. The cut unnecessary portion falls into the trash box 16 disposed below the cutter 40 to be accumulated inside the trash box 16.

The first feeding roller 77*e* is reversed, and thus, the sheet paper 201 whose unnecessary portion of the rear end has been cut is transported along the discharge path 83 to the printing path 82. In addition, the grip roller 77*d* is reversed again, and thus, the sheet paper 201 passes through the printing path 82 and returns to the printing downstream path 87. Then, the reversing roller 77*c* rotates to return a part of the front side of the sheet paper 201 in the transport direction back to the paper feeding path 81.

Next, in a state where the creasing switching flap has been switched, the reversing roller 77*c* is reversed and the sheet paper 201 is transported to the creasing path 88. The second feeding roller 77*h* rotates to move the sheet paper 201 and thus a vicinity portion of the front end of the sheet paper 201 in the transport direction reaches the creasing portion 50. Then, the creasing portion 50 forms a streak in the vicinity portion of the front end of the sheet paper 201 in the transport direction.

Next, revering the second feeding roller 77*h* and the reversing roller 77*c* causes the sheet paper 201 which has been transported to the creasing path 88 to pass through the reversing portion including the printing downstream path 87 and the paper feeding path 81 and to be transported to the printing path 82. In the printing path 82, the grip roller 77*d* is reversed again, and thus, the sheet paper 201 is transported to the discharge path 83. Then, the first feeding roller 77*e* rotates to transport the sheet paper 201 to the cutter 40.

The cutter 40 cuts the unnecessary portion of the front end of the sheet paper 201. The cut unnecessary portion falls into the trash box 16 disposed below the cutter 40 and is accumulated within the trash box 16.

The first feeding roller 77*e* rotates so that the sheet paper 201 whose unnecessary portion of the front end has been cut passes through the cutter 40 and moves forward. The rotation of the first discharge roller 77*f* causes the sheet paper 201 which has been advanced to the front of the cutter 40 to be transported to the upper discharge path 85. The second discharge roller 77*g* disposed near the upper discharge port 13*b* rotates to discharge the sheet paper 201 from the upper discharge port 13*b*.

At this time, as illustrated in FIG. 9, the holding member 110 holds the front cover member 300 in the V-shaped cross-section and is disposed on the paper discharge tray 12*a*. Accordingly, the sheet paper 201 is stacked and accumulated on the bottom plate 111 of the holding member 110 from the upper discharge port 13*b*. Each accumulated paper 201 includes the streak extending in the width direction W and formed in the vicinity of the end portion of the tip edge 201*d* near the spine 302 by the creasing portion 50.

When a predetermined number of printed sheets of the paper 201 are accumulated on the bottom plate 111 of the holding member 110, the pressing driving portion 98*c* is driven under the control of the controller of the printer 100, and the pressing links 98*a*, 98*b* hook the protrusion portions 112*a*, 113*a* of the holding member 110 and simultaneously press the protrusion portions 112*a*, 113*a* rearward by the same amount.

Thereby, the holding member 110 is pressed rearward, the tip edge 201*d* of the paper 201 abuts against the inner surface of the spine 302, and the outer surface of the spine 302 is pressed against the heat transfer member 92. At this time, the rear end edges 201*a* of the printed sheets of the paper 201 are aligned.

Next, under the control of the controller of the printer 100, the heating portion 90 generates heat, the pressing driving portion 98*c* is driven, and the spine 302 pressed against the heat transfer member 92 is heated. Thereby, the hot melt on the inner side of the spine melts, and the hot melt having improved fluidity flows into the end portion of the tip edge 201*d* side of the paper 201 abutting against the spine (i.e., the portion on the tip side further than the streak formed by the creasing portion 50).

The heating portion 90 may be heated before the paper 201 is discharged from the upper discharge port 13*b* or may be heated before the driving of the pressing portion 98 and after the discharge of the paper 201. The heating portion 90 terminates the heating operation after heating for a predetermined time. The hot melt flown between the sheets of the paper 201 is cooled, the fluidity decreases, the sheets of the paper 201 adhere to each other, and the adhered sheets of the paper 201 adhere to the inner surface of the spine 302.

Next, the driving of the pressing portion 98 is released, the holding member 110 is released from the rearward pressing, and the holding member 110 can be extracted upward from the paper discharge tray 12*a* together with the front cover member 300.

A photo book that is made by the front cover member 300 and the paper 201 adhering to each other is removed from the holding member 110 by being pulled rearward from the holding member 110.

This way, according to the printer 100 of the present embodiment, a bundle of the paper 201 can be firmly aligned and bound with a simple configuration.

(Operation on Roll Paper) The operation where the printer 100 according to the present embodiment performs printing on the roll paper 202 and discharges the roll paper 202 will be simply described with reference to FIG. 3.

First, the roll paper feeding roller 77*i* rotates so that the paper 203 is unrolled from the portion of the outermost periphery of the roll paper 202 stored in the roll paper storage portion 22.

The switching of the paper feeding switching flap, the switching of the discharge switching flap, the rotation of the roll paper feeding roller 77*i*, and the rotation of the grip roller 77*d* cause the unrolled paper 203 to be transported in the printing path 82 and the printing upstream path 86 and to be fed by the length required for the printing.

Next, the reverse of the grip roller 77*d* and the roll paper feeding roller 77*i* causes the fed paper 203 to return to the printing path 82 and the roll paper feeding path 89. While the paper 203 passes through the printing path 82, the printing portion 30 performs printing on the paper 203.

In a case where color printing is performed on the paper 203, when an overcoat processes with the ink ribbon 32 while changing the color of the ink ribbon 32, as in the case of the sheet paper 201, the printing is repeated in the transport in the direction toward the discharge port and in the reversed transport, and the color printing and the overcoat process end.

When the printing on the paper 203 ends, the reverses of the roll paper feeding roller 77*i* and the grip roller 77*d* cause the paper 203 to pass through the roll paper feeding path 89 and the printing path 82 and the switching of the discharge switching flap causes the paper 203 to be transported to the discharge path 83.

In the discharge path 83, the rotation of the first feeding roller 77*e* causes the paper 203 to pass through the cutter 40 and the cutter 40 cuts the unnecessary portion of the front end of the paper 203 in the transport direction, as necessary. The cut unnecessary portion of each of the paper 203 is accumulated in the trash box 16.

The rotation of the first discharge roller 77*f* causes the printed paper 203 whose unnecessary portion has been cut to pass through the upper discharge path 85 and to be transported to the upper discharge port 13*b*.

When the printed region of the paper 203 passes through the cutter 40, the cutter 40 cuts the paper 203 so that the paper 203 including the printed region is separated from the paper 203 connected to the roll paper 202.

The first feeding roller 77*e*, the grip roller 77*d*, and the roll paper feeding roller 77*i* reverse, causing the paper 203 which remains connected to the roll paper 202 to be wound around the roll paper 202 while the paper 203 including the printed region that has been separated from the roll paper 202 is discharged from the upper discharge port 13*b*.

In the printer 100 according to the present embodiment, the pressing portion 98 is driven under the control of the controller of the printer 100. However, the pressing portion 98 may be driven through a manual operation by a user. Accordingly, the user may select a timing and the like of the driving as desired.

In addition, in the printer 100 according to the present embodiment, the holding member 110 is displaceable in the width direction in the paper discharge tray 12*a*. However, the holding member 110 may not be displaceable in the width direction in the paper discharge tray 12*a*. In addition, the dimension in the width direction W between the side plates 112, 113 corresponding to the side edge guide portions may not be substantially the same as the dimension of the width of the paper 201 and may be more than the dimension of the width of the paper 201 in the width direction W.

In this case, the following configuration may be adopted. Unless the surfaces of the paper 201 are attracted to each other with a strong force due to the action of the static electricity, before the pressing portion 98 presses the paper 201 accumulated on the bottom plate 111 of the holding member 110, the user may temporarily extract, from the paper discharge tray 12*a*, the holding member 110 and the front cover member 300, where the paper 201 is accumulated, and may manually move the paper 201 toward the side of the side plate 112 or the side of the side plate 113 in the width direction W to align the position of the paper 201 in the width direction W. Next, the user may return the holding member 110 and the front cover member 300, where the paper 201 is accumulated, to the paper discharge tray 13*a*, and then, the operation of the pressing portion 98 may be performed.

In addition, an anti-static brush that comes into contact with the paper 201 to remove the static electricity of the paper 201 may be provided in the vicinity of the upper discharge port 13*b* to prevent static electricity from being generated in the paper 201 or to reduce the static electricity generated in the paper 201 when the paper 201 is discharged from the upper discharge port 13*b*.

In addition, in the printer 100 according to the present embodiment, the holding member 110 is configured to be detachable from the paper discharge tray 12*a* of the printer 100. However, the holding member 110 may be configured to be integrated with the printer 100 without being removed from the paper discharge tray 12*a*.

In the case that the holding member 110 is configured to be integrated with the paper discharge tray 12*a*, a structure where the holding member 110 is displaceable in the width direction W of the paper 201 on the paper discharge tray 12*a* may be applied as described below.

For example, the bottom plate 111 of the holding member 110 may include long holes where a length direction matches with the direction in which the side plates 112, 113 extend. A plurality of pins having substantially the same width as the long hole and having a slightly larger height than the thickness of the bottom plate 111 of the holding member 110 may be provided from the bottom plate of the bottom surface 12*b* of the paper discharge tray 12*a*. The pins may penetrate the long holes, and the head portion of each of the pins may be formed to have a wider size than the width of the long hole to prevent the pin from being removed from the long hole. Thereby, the holding member 110 may be displaceable in the width direction W on the paper discharge tray 12*a*.

The printer 100 according to the present embodiment is an example where the heating portion 90 is applied as the binding portion. The binding portion of the printer is not limited to the heating portion 90. The printer may have a binding portion that may integrally bind a bundle of sheets of the paper 201 stacked on the bottom plate 111 of the holding member 110 together with the front cover member 300. The binding portion may be a stapler, for example.

The printer 100 according to the present embodiment is the sublimation thermal printer. However, the printer according to the present invention is not limited to the sublimation thermal printer and may be a printer other than the sublimation thermal printer.

Specifically, the printer according to the present invention may be a thermal printer other than the sublimation type. The printer according to the present invention may be, for example, an inkjet printer other than a thermal printer or may be a printer of other printing types.

The printer 100 according to the present embodiment includes the sheet paper storage portion 21 and the roll paper storage portion 22. However, the printer 100 according to the present invention may include at least the sheet paper storage portion 21 and may not include the roll paper storage portion 22.

The holding member 110 is configured to be integrated with the printer 100 according to the present embodiment or is configured to be a part of the printer 100 but to be detachable from the printer 100. However, the holding member 110 may be independent as a bookbinding assisting tool that may be used for printers other than the printer 100 according to the present embodiment. Such a holding member 110 used as the bookbinding assisting tool is an embodiment of the bookbinding assisting tool according to the present invention.

According to the holding member 110 (bookbinding assisting tool) of the present embodiment, a bundle of the paper 201 can be firmly aligned and bound with a simple configuration.

The invention claimed is:

1. A printer comprising:

a paper discharge tray that is configured to accumulate paper discharged from a discharge portion; and a holding member that is provided at a position where the paper discharged from the discharge portion is stacked, the holding member configured to be integrated with the paper discharge tray or held to be extractable from the paper discharge tray, wherein the holding member comprises a pair of side edge guide portions that are configured to guide opposite side edges of the paper, and wherein the holding member is configured to be held to be movable to a position of the paper in a width direction where the paper is stored between the pair of side edge guide portions in response to a force acting when the discharged paper comes into contact with the pair of side edge guide portions.

2. The printer according to claim 1, wherein the holding member is configured to hold a front cover member where a front cover, a back cover, and a spine are integrally formed by opening a portion confronting the spine in a state where the portion faces the discharge portion, the front cover being held in a substantially V-shape.

3. The printer according to claim 2, further comprising a binding portion that is configured to bind a bundle of the paper together with the front cover member.

4. The printer according to claim 3, further comprising a pressing portion that is configured to press the holding member to displace the spine toward the binding portion.

5. The printer according to claim 1, wherein the holding member comprises a paper alignment portion that is configured to align edges of the paper discharged from the discharge portion.

* * * * *